Figure 1:
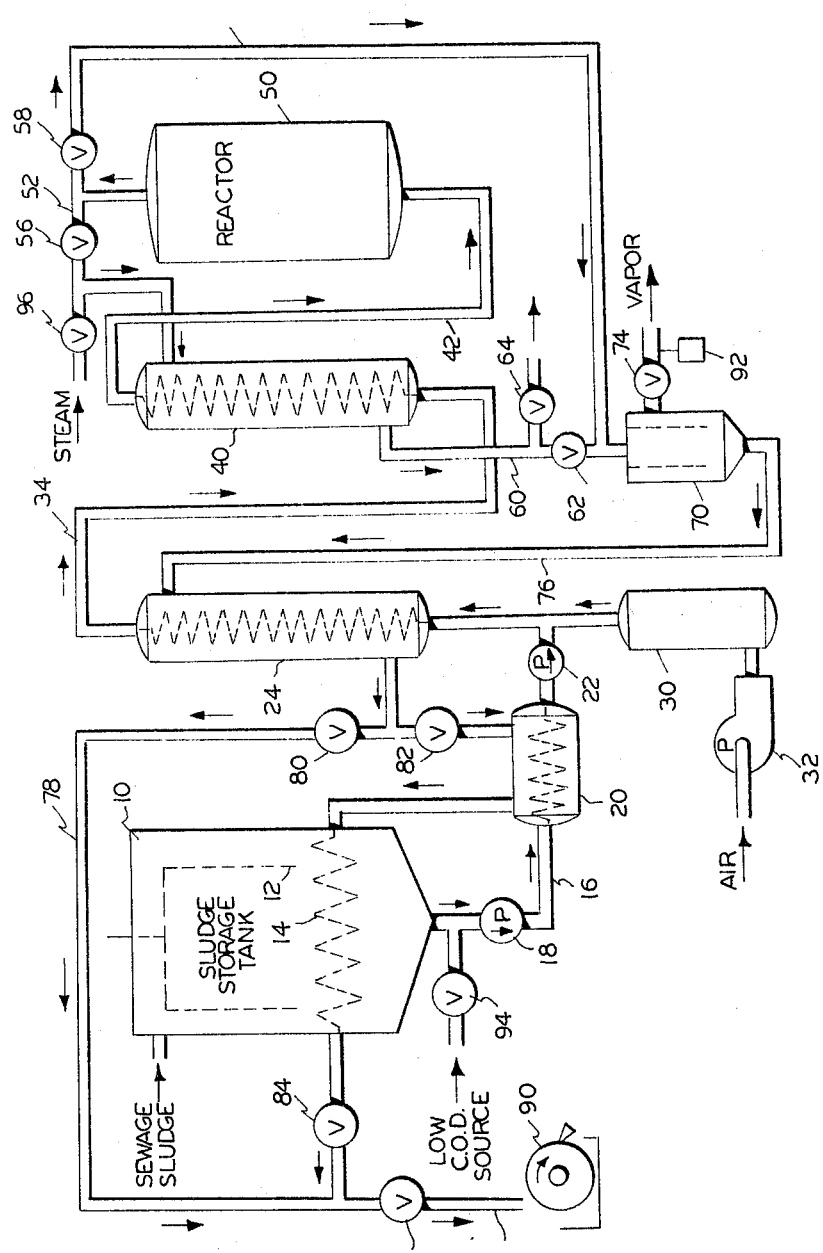

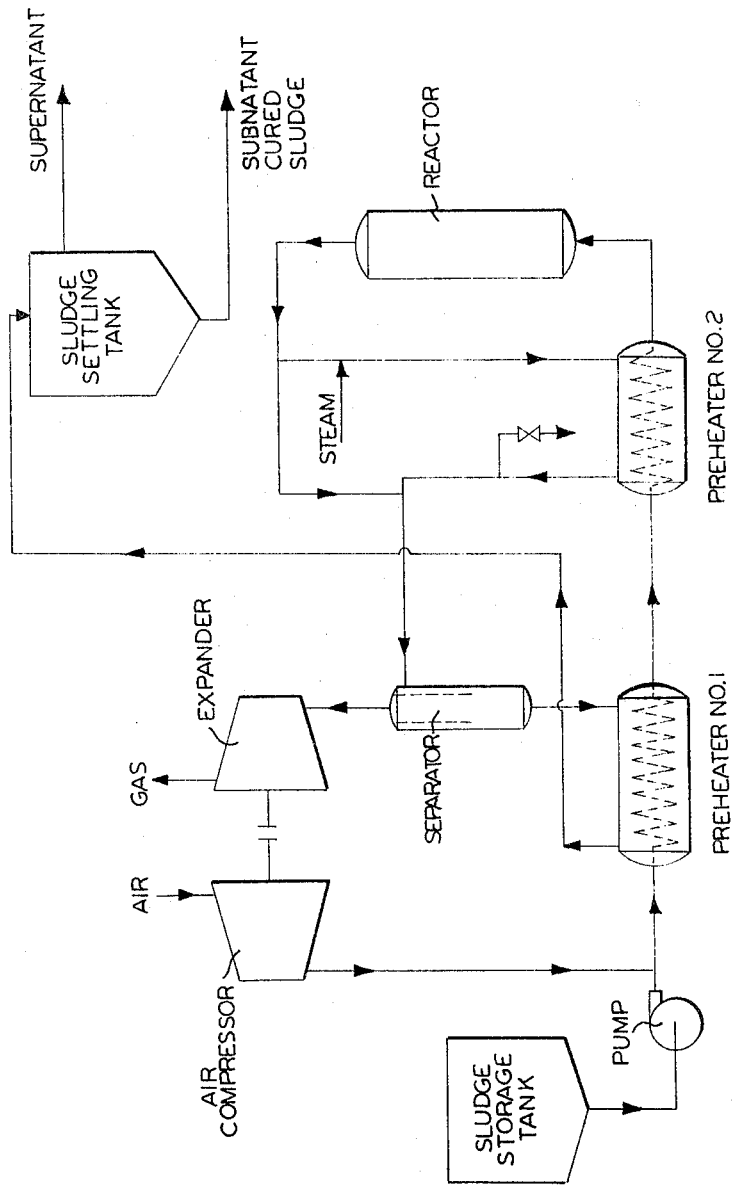
FIG. 2
INVENTORS
WAYNE B. GITCHEL
CLARENCE A. HOFFMAN
EUGENE W. SCHOEFFEL
BY 
ATTORNEY

United States Patent Office 3,272,740
Patented Sept. 13, 1966

3,272,740
SEWAGE SLUDGE TREATMENT PROCESS
Wayne B. Gitchel and Clarence A. Hoffman, Rothschild, and Eugene W. Schoeffel, Kronenwetter, Wis., assignors to Sterling Drug, Inc., New York, N.Y., a corporation of Delaware
Filed June 24, 1964, Ser. No. 377,694
3 Claims. (Cl. 210—63)

This invention relates to a sewage sludge treatment process to produce an innocuous, substantially odor-free, cured organic sludge having optimum processing characteristics.

The ultimate objective of a sewage treatment process is the disposal of the oxygen-consuming solids suspended therein. The simplest technique is the so-called primary treatment which permits a portion of the suspended solids to settle to the bottom or float to the top of a large settling basin so that an effluent is obtained containing usually less than half the suspended solids and about 60 percent or less of the Biochemical Oxygen Demand (B.O.D.) of the raw sewage. The B.O.D. of this effluent can be further reduced, e.g., to minimal values, by an aerobic biological process which can also remove a substantial portion of the B.O.D. in the sewage effluent from the primary zone, producing what is generally referred to as an "activated" or secondary sludge.

These primary and aerobic secondary treatments both produce sludges containing high percentages of water. These sludges are usually further concentrated, using chemical, biological and/or mechanical techniques, before final solids are obtained as an essentially dry products, e.g., by settling an a sand bed or by mechanical separation.

One supplementary technique is the gas digester which removes about half the B.O.D. of primary sludge biologically by gas production and at the same time concentrates the sludge into a higher solids content sludge.

Each of the above referred to sludges, i.e., primary, aerobic or activated, and digested sludges, present problems in handling well known in the art. The processability, i.e., ease of water removal, of each of their sludges is markedly improved by the process of this invention and, as starting materials therefor, are hereinafter referred to collectively as "sewage sludge," which term also includes reasonably concentrated raw sewage containing about 10 to 20 or more g./l. C.O.D.

One technique known in the art for improving the processability of sewage sludge is the Porteous process, claimed in U.S. Patent 2,075,224. This process is essentially a heat curing process in the absence of air at elevated temperatures and pressures. This process markedly improves the filterability of sewage sludge but produces a highly offensive, foul-smelling sludge objectionable to personnel and any nearby residents. This sludge is thus ill-suited for direct fill or agricultural use without further expensive processing to produce innocuous solids. The process also presents difficulties in operation from an equipment fouling point of view. Also, filterability while much improved compared with primary sludge, is not optimum.

Another technique is the Zimmerman wet-air oxidation technique. This process, the subject of several patents, including U.S. 2,665,249, involves the oxidation of the organic portion of sludge to produce an essentially inorganic solid residue. In this process, the Chemical Oxygen Demand (C.O.D.) is eliminated by oxidative destruction of the organic solids. This residue, while completely innocuous, has little value for agricultural purposes other than fill as it is essentially extremely fine silica and ash. The process also requires large volumes of gaseous oxygen, which contributes substantially to its initial and operating costs.

A modification of the Zimmermann process is claimed in U.S. Patent 3,060,118. This process also eliminates substantially all the insoluble organic solids from the sewage sludge by a process involving oxidizing from 60 to 85 percent of the oxidizables in the sludge. This high level oxidation process also requires substantial volumes of gaseous oxygen and produces sludge solids which, although innocuous, are essentially inorganic in character.

Thus there does not exist in the prior art a method of producing innocuous sludge solids organic in character having excellent processability and whose insoluble solids have low water retention properties.

It is therefore an object of this invention to provide a process for treating sewage sludge to improve its filterability and processability to optimum values.

It is another object to provide a process for treating sewage sludge to improve its processability and produce an innocuous cured sludge organic in character with low water retention properties.

It is a further object to provide a process for treating sewage sludge by wet air oxidation employing small amounts of gaseous oxygen.

It is a further object to provide a process whereby one or more of the above objectives are achieved by a process of lower initial and operating cost and more trouble-free in operation.

It is still another object to provide a process whereby the above objectives can be achieved by a continuous, industrially feasible process.

Other objects will be apparent to those skilled in the art to which this invention pertains.

According to this invention, an innocuous cured organic sewage sludge having optimum processing characteristics is produced by the wet air oxidation of a continuous stream of sewage sludge in the presence of a continuous stream of a substantially constant volume of gaseous oxygen under conditions of temperature and pressure which reduce by 5 percent to 45 percent the Chemical Oxygen Demand of the sludge while adjusting at least one of the temperature to which the mixture is heated, the sludge flow and the C.O.D. of the incoming sludge in a manner directly proportional to variations in the gaseous oxygen content of the gaseous phase of the oxidized mixture so as to maintain the sludge at all times in the presence of gaseous oxygen during the wet air oxidation.

It was found that an innocuous organic cured sewage sludge having optimum processing characteristics and whose suspended solids are useful as a soil conditioner, composting ingredient and fill is obtained if the C.O.D. of the sewage sludge is reduced by wet air oxidation from 5 percent to 45 percent. An even superior product is obtained if the C.O.D. reduction is from 10 percent to 35 percent, desirably about 10 or 15 percent up to 30 percent. Its specific resistance to filtration and water holding capacity is lower than sewage sludge treated by the Porteous process and its processability in solids separation systems is superior to the ash obtained from sewage sludge oxidized by the process of U.S. 2,665,249 or 3,060,118. The solids obtained by filtration of the cured sludge are useful as a component of soil conditioners and fertilizers because of their fiber and insoluble humic acid content. Because of their low protein content they are innocuous and remain so, in contradistinction to the offensive sludge produced by the Porteous process. It was surprising to discover the portion of the oxidizable material which is oxidized at 5 to 45 percent oxidations is the portion which causes heated sewage sludge to be highly offensive. The solids are high in fiber and organic content, in contradistinction to the inorganic ash obtained by the process of U.S. 2,665,249 or 3.060,118, i.e., highly oxidized material. Their protein content is less than 2.5 percent, and often less than 1.5 percent, and their crude fiber content is at least 25 percent, and often 30 percent or more, dry weight basis. They have a C.O.D. value generally about 0.75 to 1.25 times the weight of the dry solids and sufficient B.t.u. content to be combustible in the dry state. They have other distinguishing properties, as will be apparent from the examples.

These cured sewage sludge solids are isolated by separating the effluent liquid from the cured sewage sludge obtained from the wet air oxidation step of the process of this invention, e.g., by settling on a sand bed or rotary drum filtration and dried, e.g., in a hot air oven, to obtain a completely dry product which can be reground into a granular material and used or sold to partially defray the cost of the process. The water holding capacity of the insoluble solids of the cured sludge is significantly lower than other types of sludges. Therefore, the sludge solids can be converted into useful or disposable material much more readily than conventional sewage sludges.

It was found that the low degrees of oxidation employed in the process of this invention do not destroy the fibrous structure of sewage solids as occurs at higher degrees of oxidation. During vacuum filtration the fibers form a beneficial mat which retains fines while maintaining a porous filter cake, thereby allowing good air flow through the cake which facilitates maximum drying. The fibers cause the cake to form a continuous sheet not unlike a thick sheet of paper board which, because of its cohesiveness, is easily and cleanly discharged from the filter medium. In addition, since the cake is held together by the fibers it does not readily crack when dried on the filter drum and a uniform pressure drop is maintained through the cake and equal distribution of air through all portions of the cake is maintained. Highly oxidized sludge solids, on the other hand, are without fibers, contain very fine particles, many less than 200 mesh, and form a very compact, sticky cake which as it dries cracks into many small segments thereby permitting air passage through the cracks rather than through the cake itself so that drying is impeded. Also, because of its lack of continuity the cake is more difficult to discharge from the filter drum. It is also easily smeared into the filter media thereby accelerating filter media blinding. The fine particles of the highly oxidized solids also have a tendency to lodge in the filter media openings, thereby eventually clogging the filter media and reducing filtration rates. If filter media blinding is avoided by using a filter cloth with larger openings the small particles in highly oxidized solids pass through the filter medium thereby lowering the separation efficiency of the filter and producing a dirty filtrate. A relatively open mesh filter cloth can be used with lowly oxidized solids because the fibers in the solids bridge the filter media openings and form a filter mat which retains the fines.

The following table illustrates the markedly improved filtration characteristics of digested primary sludge when oxidized according to the claimed procedure so as to achieve 10 percent to 45 percent oxidation, compared with the starting sludge and sludge heated in the absence of air at comparable temperatures.

| Sludge | Specific Filtration Resistance (sec.²/g.×10⁷) | Average filtration rate (gal./hr. ft.²) |
| --- | --- | --- |
| Starting primary sewage sludge | 2,000 | <1 |
| Heated in absence of air | 800 | <2 |
| Oxidized 10% | 25 | 7 |
| Oxidized 20% | 4 | 40 |
| Oxidized 45% | 6 | 30 |

At higher oxidation levels, e.g., 60–80 percent, specific resistance is also low, although slightly higher than at 10–45 percent, but because of crude fiber loss above about 45 percent C.O.D. reduction, the cured sludge performs poorer on vacuum filter equipment than sludge whose C.O.D. has been reduced about 5 percent to 45 percent, especially those reduced about 10 percent to 35 percent.

The cured sewage sludge itself is obtained from the wet air oxidation step of the novel process. The term "wet air oxidation" is a term of the art meaning an oxidation at above 100° C., usually temperatures above about 150° C. with gaseous oxygen, usually that present in air, in the presence of water at least a portion of which is maintained in the liquid state by conducting the oxidation under pressure.

A wet air oxidation of sewage sludge reduces both its B.O.D. and C.O.D. While the B.O.D. of sewage sludge conventionally is the value considered from the standpoint of loading and pollution of streams, it is a somewhat imprecise value and depends upon an arbitrary definition of test conditions. A more absolute and precise value is the C.O.D., i.e., the amount of oxygen consumed in a potassium dichromate digestion. Obviously, the C.O.D. of sewage sludge is always higher than its B.O.D. as microorganisms are incapable of completely oxidizing the oxidizables. Thus, while the C.O.D. of sewage is a somewhat artificial value from the standpoint of stream pollution, it is a better reference value for processes in which the sewage is oxidized by a non-biological technique because of its greater preciseness. On the other hand, of great significance is the fact that a 25 percent C.O.D. reduction results in a 75–80 percent reduction in 5 day B.O.D. of the insoluble solids and a 30 percent C.O.D. reduction reduces their B.O.D. over 90 percent. This means the solids obtained by the claimed process are biologically quite stable although still organic in character.

Partial wet air oxidation can be achieved batchwise or on a continuous basis, i.e., continuously oxidizing a stream of sewage sludge mixed with a continuous stream of gaseous oxygen. This invention is directed to a continuous partial wet air oxidation.

One means of achieving partial wet air oxidation is to employ conditions of time, temperature and pressure whereby a C.O.D. reduction greater than 45 percent would occur if sufficient oxygen were present to permit it but limit the amount of gaseous oxygen supplied so that it is completely consumed before a level of oxidation greater than 45 percent occurs. However, when the amount of oxygen supplied is less than that capable of being consumed under the reaction conditions, the resulting cured sludge has less desirable properties and often is an obnoxious material which tends to foul equipment, similar to that produced by the Porteous process.

It was found a desirable, innocuous organic sludge could be produced by limiting the gaseous oxygen supplied to the wet air oxidation zone to about 5 percent to about 45 percent of the C.O.D. of the sludge and employing oxidation conditions whereby a degree of oxidation is achieved which does not consume all the gaseous oxygen supplied to the zone.

On a continuous basis, the degree of oxidation can be limited to a selected amount to achieve a 5 percent to 45 percent reduction in the C.O.D. of the sludge by controlling the temperature of the oxidation zone, or the time during which the sludge is heated in the oxidation zone. With unlimited time, about a ten percent oxidation can be achieved at 100° C., about a 65 percent oxidation at about 170° C., and about 75 percent at about 180° C. At about 200° C., about a 60 percent or higher oxidation is obtained. On a continuous basis, extremely long reaction times are not feasible because of the volumes of liquids handled. Therefore, reaction time is also controlled in the process of this invention by reactor size and sludge flow rates. For example, whereas in twenty minutes no more than about 5 percent oxidation is achieved at about 150°, about 10 percent at 170° and about 45 percent at 225°. In five minutes, no more than a 5 percent oxidation is usually achieved at 200°, and about 20–45 percent at about 225° C. A similar relationship exists with higher temperatures and shorter reaction times, depending upon a variety of conditions, including the $\Delta t$ in the reactor, i.e., inlet and outlet temperature differential.

An important aspect of the continuous process of this invention is that at any selected oxidation temperature and time, a sludge is obtained having superior settling properties than corresponding sludge merely heated at the same temperature for the same period of time. Because the settling rate of sludge improves the higher the temperature to which it is oxidized, this invention preferably employs an oxidation temperature as high as practicable with the equipment available, the oxidation level being controlled by the time during which the sludge is heated at the selected temperature. Thus, a preferred aspect of this invention comprises an oxidation temperature of at least 175° but more preferably about 200° to 225° C., ordinarily for less than 7 minutes.

Because it is expensive to provide large volumes of gaseous oxygen under pressure, it is desirable to supply an amount of oxygen only slightly in excess of the amount consumed under the selected oxidation conditions, preferably so that the exhaust gases contain between about 0.5 percent to 6.5 percent oxygen, more desirably about 1 percent to about 4 percent. However, in attempting to do so, it was discovered that from time to time, despite all efforts to maintain conditions constant, oxygen would become exhausted, usually due to unavoidable variations in the C.O.D. of the input sludge. Such a temporary loss of excess gaseous oxygen can produce undesirable pressure surges when excess oxygen once again is present and accumulated unoxidized organic material is instantaneously oxidized. This problem is particularly acute when very low levels of C.O.D. reduction are attempted, e.g., 25 percent to as low as 5 percent or 10 percent. It thus became apparent that reducing the C.O.D. of sewage sludge the desired amount, i.e., from 5 percent to 45 percent by wet air oxidation, found to be highly desirable from the standpoint of the properties of the cured sludge and the suspended solids contained therein thus produced and the economies of installation and operation possible in an industrial plant employing such a treatment, could not readily be achieved in a continuous operation.

It was found, however, that a partial wet air oxidation within the desired limits could be achieved industrially on a continuous basis by continuously mixing a substantially constant volume of sewage sludge with a substantially constant volume of gaseous oxygen in a selected proportion which supplies to the mixture an amount of oxygen capable of reducing by more than 5 percent the C.O.D. of the sludge by oxidation; continuously heating a stream of the resultant mixture under conditions which reduce by wet air oxidation the C.O.D. of the sludge by an amount, between 5 percent and 45 percent, which consumes an amount of gaseous oxygen less than that supplied to the mixture under the selected oxidation conditions; and maintaining substantially constant the gaseous oxygen consumed by adjusting at least one of the temperature to which the mixture is heated, the incoming sludge flow rate and the volatile solids content of the incoming sludge, in a manner directly proportional to variations from the average in the gaseous oxygen content of the gaseous phase obtained from the oxidation, thereby maintaining the sludge at all times in the presence of gaseous oxygen during the wet air oxidation.

For the reasons stated above, desirably the amount of gaseous oxygen mixed with the sewage sludge to be treated is limited so as to provide no more than about 0.5–6.5 percent gaseous oxygen content to the gaseous phase of the result oxidation mixture.

Once the desired level of C.O.D. reduction is achieved, it becomes necessary to adjust from time to time one or more of the variables of the system in response to variations in oxygen consumption in the system. One technique for adjusting oxygen consumption is to lower the C.O.D. of the incoming sludge by dilution when oxygen content drops below about 1 percent in the exhaust gases. Any low C.O.D. source (water, raw sewage or effluent from a primary or secondary treatment) can be used for this purpose. The amount and frequency of dilution can be controlled, for example, by a solenoid activated valve in the line supplying the low C.O.D. material, activated by a drop below 1 percent in the gaseous oxygen content of the gaseous phase of the oxidized mixture. Such a procedure eliminates the necessity of a variable output pump and maintains a constant flow rate through the system, a desirable result thermodynamically.

Another technique for adjusting oxygen consumption is to vary the time during which the sludge-oxygen mixture is heated to the selected oxidation temperature. This can be achieved by equipment design, i.e., by use of by-pass systems or by varying the flow rate of the total sewage-oxygen mixture. These techniques require rather elaborate equipment and controls and alters drastically the conditions within the equipment and thus is not ordinarily a preferred technique.

Another possible technique is to vary the gaseous oxygen flow rate while maintaining constant the sludge flow rate. Here also, equipment considerations make this approach unattractive.

Adjusting temperature is a convenient means of regulating oxygen consumption. Pressure and temperature are inter-related, i.e., at equilibrium lowering pressure will lower temperature due to the increased production of steam. Thus adjusting pressure is a convenient method of adjusting temperature in a continuous operation. Generally pressures above about 150 p.s.i., preferably above about 600 p.s.i. or higher, are employed for efficient operation.

Another convenient method of temporarily adjusting the temperature of the oxidation is to adjust the pre-heat temperature of the incoming sludge. If the sludge is heated by countercurrent heat exchange with the oxidized mixture, the adjustment can be achieved by the amount of heat transferred, e.g., by by-passing a portion of oxidized mixture or a portion of a multiple unit heat exchanger. Such a technique has limits because if the temperature drops too far, substantially all oxidation rather than just a small fraction thereof will cease.

However, the preferred technique for adjusting oxygen consumption is to maintain all other variables constant and adjust input sewage sludge flow rate. This is readily achieved using a bellows type intermittent cycle pump, the flow being regulated by regulating the number of cycles per minute.

Any of the above techniques for adjusting oxygen consumption can be made fully automatic by instrumentation, e.g., employing electronic switching means activated by a predetermined variation from a selected oxygen content in the exhaust gases, as determined by an automatic gas analyzer.

Because oxidation can continue so long as residual C.O.D. and gaseous oxygen remain in contact at temperatures above 100° C., when the desired level of C.O.D. reduction is achieved, the cured sludge is cooled below about 150° C., preferably below 120° C. Desirably, this is achieved in a heat exchanger which transfers at least a portion of the heat in the oxidized mixture to the incoming sludge and gaseous oxygen, before or after they are mixed or both.

The claimed process produces a sludge whose solids are useful as a soil conditioner or as stable land fill. Therefore, the oxidized sludge desirably is continuously filtered as it is obtained, e.g., by pumping on a sand bed or preferably by mechanical vacuum filtration, most preferably by rotary drum filtration as the discharge rate is higher and the incident of equipment down-time for clearing is lower than with other sludges on this equipment.

For a further explanation and illustration of the claimed process, reference is made to the drawings in which, FIGURE 1 is a schematic illustration of an equipment set-up for conducting the claimed process, and FIGURE 2 is a flow diagram of a pilot plant set-up for conducting the claimed process.

In the apparatus of FIGURE 1, sewage sludge, maintained in a storage tank 10 and kept from settling by stirrer 12 and heated by an internal heat exchanger 14 is pumped at a constant selected rate through pipe 16 by pump 18 through a second heat exchanger 20 and then by a high pressure pump 22 to a first heat exchange system 24. Prior to entry into the heat exchange system, the sludge is mixed with a constant selected volume of air from an air tank 30 maintained at the selected pressure by compressor 32. The heated sludge-air mixture is then passed through pipe 34 to a second heat exchange system 40 where it then passes through pipe 42 to the wet air oxidation reactor 50. The hot oxidized sludge mixture emerges from the reactor and at least the gaseous phase of the oxidized mixture passes through pipe 52 in heat exchange relationship with the incoming sludge in the second heat exchange system 40 before passing through pipe 60 and valve 62 into separator 70. Condensates can be discharged from the system by valve 64. At least a portion of the liquid phase of the oxidized mixture passes through pipe 54 directly to separator 70, the proportion being regulated by valves 56 and 58. The gaseous phase of the partially cooled oxidized mixture is separated and discharged through valve 74 where, prior to venting, it can be reduced in pressure and mixed with incoming air to humidify it, by means not shown. The liquid phase of the oxidized sludge is then passed through pipe 76 into the first heat exchange system 24 in heat exchange relationship with the incoming sludge. More of its heat can be transferred to the incoming sludge through the first and second heat exchangers 14 and 20, or these heat exchangers can be by-passed by passing a portion of the oxidized liquid phase through pipe 78, as determined by valves 80, 82 and 84. The liquid phase is then discharged through valve 84 and pipe 86 to a separating system, such as a settling tank and rotary drum vacuum filter system, where the cured sludge solids are separated from the effluent liquid. A gas analyzer 92 measures the oxygen content of the exhaust gases and responsive to changes in the oxygen content, manually or automatically, an adjustment is made in the pumping rate of pump 18, the pressure of the system by opening pressure release valve 64, the preheat temperature of the incoming sludge by regulating valves 56 and 58, the C.O.D. content of the sludge by opening valve 94 which releases a low C.O.D. aqueous liquid into the system, or one of the other elements of the apparatus controlling the oxygen consumption. Supplementary heat necessary to maintain the desired reactor temperature can be supplied by high pressure steam through valve 96.

In the operation of the equipment shown in FIGURE 1, a finely ground uniform primary sewage sludge in tank 10 containing about 80 g./l. C.O.D. was pumped through the reactor at a velocity of about 5 feet per second (about 100 gallons per minute). Air sufficient to reduce the C.O.D. of the sludge between 25 and 30 percent was provided by compressor 32. Steam was injected into the system, maintained at about 600 p.s.i., until the reactor temperature reached about 185° C. The oxidation became self-sustaining and the reaction temperature was then adjusted, by controlling the proportion of the oxidized mixture passing through the second heat exchange system, until the exhaust gas analyzer indicated a 1 percent oxygen content. Fluctuations in the oxygen content of the exhaust gases were thereafter controlled by corresponding adjustment of the flow of primary sludge to the reactor. The oxidation was continued for eight hours until the primary sludge was exhausted. The exiting oxidized sludge was continuously filtered on a rotary drum vacuum filter. A high cake discharge rate was achieved and the drum cloth rarely required clearing. The cake was dried in a hot air oven and ground to granular powder using conventional equipment. The dry solids were a substantially odorless, highly fibrous organic material much like humus with a protein content below 2.5 percent and a crude fiber content above 25 percent. It improved considerably the agricultural qualities of very sandy and clay soils.

The following illustrates the composition of the dried cured sludge solids obtained by oxidation of raw primary sewage sludge at 175° and at 200° C. under conditions whereby C.O.D. reductions of 10 percent and 40 percent, respectively, were achieved and for comparison purposes, the starting sludge and sludge excessively oxidized.

| Oxidation Temp.,° C | Charge | 175° | 200° | 225° |
| --- | --- | --- | --- | --- |
| Percent oxidation | | 10 | 40 | 71 |
| Percent C.O.D | 150 | 110 | 80 | 22 |
| Percent Ash | 17 | 24 | 34 | 75 |
| Percent C | 50 | 42 | 32 | 2 |
| Percent N. (total) | 2 | 0.4 | 0.6 | Nil |
| Percent "lipids" | 21 | 14 | 3 | 1 |
| Percent "protein" | 5.46 | Nil | Nil | Nil |
| Percent crude fiber | 42 | 35 | 34 | 3 |

(Percent calc. on dry solids basis.)

The cured sludge solids obtained by 10 percent and 40 percent C.O.D. reduction are distinguished from the starting raw primary sludge by lower C.O.D., total nitrogen and protein (non-ammonical nitrogen × 6.25), lipids (ether extractables) and higher ash, and from highly oxidized material, i.e., over 45 percent C.O.D. reduction, by higher crude fiber, C.O.D., lipids, nitrogen and lower ash content. The protein content of these cured sludge solids will usually average about 1 percent to 2 percent, the lipid content about 2 percent to 17 percent, the C.O.D. from about 75 percent to 125 percent, the ash from about 20 percent to 40 percent, and the crude fiber from about 25 percent to 40 percent. They are innocuous and substantially odorless in both the wet and dry state, having at most a musty, soil-like odor.

The following are the results obtained with primary sewage sludge employing equipment illustrated schematically in FIGURE 2. Each run was about 4 hours long. The conditions maintained during the runs are given in the table below. Run 1 was conducted so that substantially no oxidation occurred and Runs 4 and 5 so that excessive oxidation occurred, for comparative purposes.

| Run | 1 | 2 | 3 | 4 | 5 |
| --- | --- | --- | --- | --- | --- |
| Reactor residence time, minutes | 6.5 | 6.4 | 6.3 | 5.9 | 5.2 |
| Reactor Outlet Temp.,° C | 199 | 222 | 221 | 245 | 247 |
| Percent Oxidation | 0.7 | 21.1 | 18.1 | 56.8 | 55.6 |
| Separator Pressure, p.s.i.g | 450 | 603 | 585 | 807 | 810 |
| Sludge Input Rate, g.p.h | 87.6 | 84.0 | 83.0 | 85.2 | 85.7 |
| Sludge C.O.D., g./l | 65.8 | 106.9 | 85.0 | 40.8 | 58.6 |
| Excess oxygen, percent in final gas | 2.5 | 1.1 | 2.1 | 0.6 | 1.0 |
| Steam generated at max. temperature, lbs./gal.[1] | 1.09 | 1.66 | 1.66 | 3.30 | 3.69 |
| Steam after No. 6 shell, lbs./gal.[1] | 0.58 | 1.01 | 1.01 | 1.80 | 2.36 |
| Temperatures,° C.: | | | | | |
| Sludge Storage Tank | 70 | 72 | 65 | 75 | 70 |
| First Liquor preheater | 156 | 159 | 150 | 165 | 161 |
| Last Liquor preheater | 184 | 204 | 202 | 227 | 226 |
| Reactor inlet | 201 | 217 | 213 | 233 | 231 |
| Reactor outlet | 199 | 222 | 221 | 245 | 247 |
| Preheater shells: | | | | | |
| Last preheater outlet | 187 | 210 | 208 | 234 | 238 |
| First preheater outlet | 160 | 161 | 150 | 165 | 161 |

[1] Based on volume of influent sludge.

Heat was supplied to the system throughout the run by circulating steam through the steam preheaters and hot oil through oil preheater.

A 1,000 gallon stainless steel tank was used as a settling tank during the first three periods. During these periods the supernatant was removed at a rate which provided a settling period of approximately 2 hours. Subnatant was withdrawn from this tank at the rate of 15 gallons per hour.

During the last two periods this tank was used to collect all of the treated liquor. At the end of each period the total volume was recorded and the contents were agitated for 15 minutes and then sampled.

In Run 1, a large volume of scum was produced which did not settle whereas no scum was produced in the other runs. Also, the specific resistance to filtration of the cured sludge of Runs 2 and 3 was lower than that of Run 1. The cured sludge of Runs 2 and 3 performed better on a vacuum filter than those of Runs 4 and 5.

The process of this invention can be adapted to provide a novel gas digester sewage treatment process. In such a process digested sludge is partially oxidized according to the present process, the undissolved solids in the oxidized product are separated, the supernatant liquid is cooled to about 75 to 105° C. and the cooled liquid is returned to the gas digester to provide nutrient for the digester, the degree of oxidation being controlled so that the ammoniacal nitrogen content of the contents of the digester is maintained below 1.0 g./l. and the extent of cooling being controlled so that the temperature of the contents of the digester is maintained substantially constant at a selected value between about 30 and 50° C. Adapting the apparatus of FIG. 1 to this process, the digested sludge can be passed continuously to the first preheater or stored in the storage tank shown in FIG. 1, if the flow rate is insufficient to provide a continuous adequate supply of digested sludge. A pump pumps the sludge under high pressure into the apparatus and an air compressor mixes the necessary amount of air with it. The mixture is then passed through the preheaters and then into the reactor where oxidation occurs, preferably at above 170° C. The partially oxidized mixture is passed from the reactor through the shell of the first preheater and then to the separator or directly to the separator, or a portion to each, depending upon the temperature of the oxidized mixture and the desired final effluent temperature. The gaseous phase is removed in the separator and exits from the system through the expander which reduces the pressure of the separated gaseous phase and in so doing produces energy which can be utilized to provide compressed air necessary for the oxidation. The separated liquid phase with suspended solids is passed through the preheater and, if necessary to provide the desired cooled temperature, through a water or air cooled heat exchanger, and then to a settling tank where the cured sludge settles and is separated from the supernatant liquid which is fed to the digester. The ammoniacal nitrogen level in the digester can be controlled by the amount of supernatant liquid recycled to the digester or the temperature employed in the oxidation, lower temperatures producing less. Alternatively or additionally, lime or caustic can be added to the oxidized mixture prior to separation of the gaseous phase to raise the pH and drive the gaseous ammonia into the gaseous phase. If the gaseous phase of the thus produced high pH oxidized mixture is separated before the mixture is passed to the shell of the second preheater rather than prior, so that the mixture is hotter at the separation, more ammonia is driven into the gaseous phase. By these techniques, heat exchangers are unnecessary in digesters maintained at above environment temperatures, higher gas production is achieved and the rate of sludge solids disposal for the system is increased because of improved filterability. Their innocuous character renders the separated solids useful as soil conditioner and fill.

What is claimed is:
1. A continuous process for producing from sewage sludge innocuous, substantially odor-free, cured organic sludge having optimum processing characteristics which comprises the steps of
   (a) continuously mixing a substantially constant volume of sewage sludge with a substantially constant volume of air in a selected proportion which supplies to the mixture an amount of gaseous oxygen capable of reducing by more than 5 percent the C.O.D. of the sludge by oxidation, to produce a mixture having a gaseous and a liquid phase;
   (b) continuously heating a stream of the resultant mixture to a temperature above about 170° C. under conditions capable of consuming all the oxygen in the mixture;
   (c) heating the mixture for a period of time which reduces the C.O.D. of the sludge by between 5 percent and 45 percent and which maintains between about 0.5 percent and 6.5 percent gaseous oxygen content in the gaseous phase of the oxidized mixture, thereby producing a cured innocuous fibrous sludge having lower specific resistance to filtration and a higher settling rate and whose insoluble solids have lower water holding capacity, compared with the starting sludge;
   (d) continuously separating the gaseous phase from the liquid phase of the oxidized mixture; and
   (e) maintaining substantially constant the amount of gaseous oxygen consumed by adjusting the temperature to which the mixture is heated in a manner which is directly proportional to variations from the average in the gaseous oxygen content of the gaseous phase obtained from the oxidation, thereby maintaining the sludge at all times in the presence of gaseous oxygen during the wet air oxidation.

2. A process according to claim 1 wherein the sludge is heated to a least 175° C. in the presence of an amount of oxygen which maintains from 1 to 4 percent oxygen in the separated gaseous phase and reduces the C.O.D. of the sludge from about 10 to 35 percent.

3. A process according to claim 2 wherein the sludge is heated to between about 200 and 225° C. for up to seven minutes.

References Cited by the Examiner

UNITED STATES PATENTS 3,060,118    10/1962    Schoeffel _____ 210—3

OTHER REFERENCES

Abel et al.: Oxidation and Stabilization of Sewage Sludges With Oxygen at Elevated Temperatures and Pressures, Sewage and Ind. Wastes, vol. 26, December 1954, pp. 1450–1452.

MORRIS O. WOLK, *Primary Examiner.*

MICHAEL E. ROGERS, *Examiner.*